United States Patent [19] [11] 3,874,296
Hedemark [45] Apr. 1, 1975

[54] PROXIMITY FUSE

[75] Inventor: Rolf Hedemark, Fjellhamar, Norway

[73] Assignees: A/S Kongsberg Vapenfabrikk, Kongsberg; Forsvarets Forskingsinstitutt, Kjeller, both of, Norway

[22] Filed: Oct. 16, 1973

[21] Appl. No.: 406,923

[30] Foreign Application Priority Data
Oct. 16, 1972 Norway .............................. 3705/72

[52] U.S. Cl. ............ 102/70.2 P, 343/7 PF, 343/14, 343/17.5
[51] Int. Cl. .......................................... F42c 13/04
[58] Field of Search ..... 102/70.2 P; 343/7 PF, 18 E, 343/14, 17.5

[56] References Cited
UNITED STATES PATENTS

| | | | |
|---|---|---|---|
| 2,671,896 | 3/1954 | DeRosa | 343/18 E |
| 3,026,515 | 3/1962 | Rey | 343/14 |
| 3,076,191 | 1/1963 | Williams | 343/7 PF |
| 3,332,077 | 7/1967 | Nard et al. | 343/7 PF |
| 3,495,243 | 2/1970 | Russell | 343/14 |

*Primary Examiner*—Benjamin A. Borchelt
*Assistant Examiner*—C. T. Jordan
*Attorney, Agent, or Firm*—Holman & Stern

[57] ABSTRACT

A proximity fuse comprising a distance measuring system based on reflection of a frequency modulated signal having a linearly increasing sweep frequency. By selecting various modulation frequencies in the modulation oscillator the proximity fuse can be made to detonate at various given distances from the designated target. When the frequency modulated signal is phase modulated in step with a quasi-random code, the safety against unintentional detonation of the projectile due to undesired jamming signals or noise signals, is substantially increased.

6 Claims, 2 Drawing Figures

PROXIMITY FUSE

BACKGROUND OF THE INVENTION

The present invention relates to a proximity fuse comprising a distance measuring system based on reflection of a frequency modulated signal having a linearly increasing sweep frequency.

Proximity fuses of this type are subject to the risk of being influenced by undesired disturbing signals which may cause false detonation of the projectile.

SUMMARY OF THE INVENTION

The object of the present invention is to provide a proximity fuse which blocks undesired jamming signals or noise signals that might occur, thereby preventing unintentional detonation of the projectile.

According to the present invention this is achieved by means of a distance measuring system of the aforementioned type, in which the frequency modulated signal is phase modulated 180° in step with a quasi-random code.

The invention will be described in the following in more detail with reference to the drawing, which shows a preferred embodiment of the proximity fuse according to the invention.

DESCRIPTION OF THE PREFERRED EMBODIMENT

Figure 1:
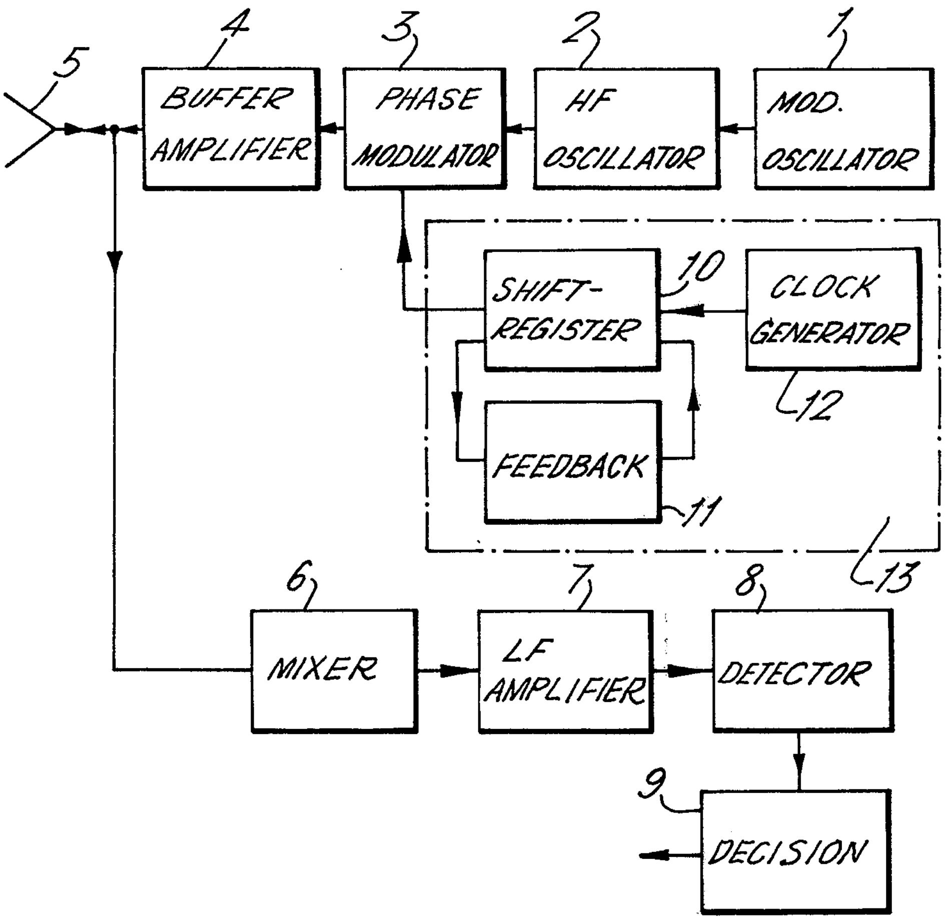

FIG. 1 is a block diagram of the electrical components included in the proximity switch;

FIGS. 2*a* to 2*f* are train wave diagrams appearing in the various components.

Figure 2:
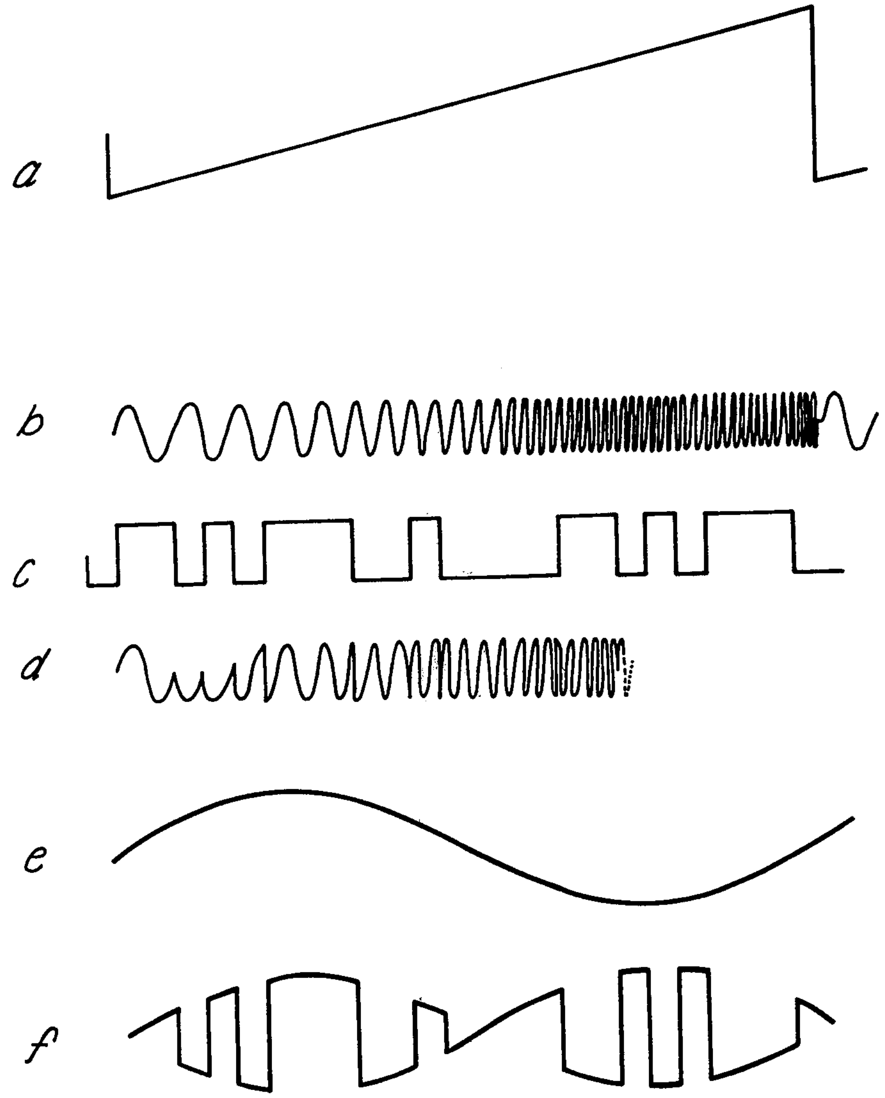

In FIG. 1, 1 designates a modulation oscillator which generates a saw-tooth voltage with a given sweep frequency and with a shape as indicated in FIG. 2*a*. The saw-tooth voltage from the oscillator 1 modulates a high frequency signal which is generated in a second oscillator 2 (FIG. 1), and the frequency modulated signal, which will have a linearly increasing frequency in each sweep period, is shaped as indicated in FIG. 2*b* before it is fed to the phase modulator 3. In the phase modulator 3 the phase of the phase modulated signal is inverted in step with the output signal from a shift register 10 driven by a clock generator 12. A feed-back circuit 11 gives a quasi-random pulse train, where the number of pulses per shift period is a function of the storage capacity of the shift register and the design of the feed-back circuit.

The pulse train coming from the shift register 10 may have a form as indicated in FIG. 2*c*, and is repeated over a period which is given by the clock generator 12 and the number of bits that can be stored in the shift register.

The frequency and phase modulated signal at the output of the phase modulator 3 has a form as indicated in FIG. 2*d*. This signal is amplified in a buffer-amplifier 4 and is thereafter supplied partly to an antenna 5 and partly to a mixer unit 6. The transmitted signal, which is both frequency and phase modulated, is reflected from the object or target, at which the projectile with the proximity fuse is aimed, and is picked up by the antenna 5 and received by the mixer unit 6. The difference in frequency between the transmitted and the reflected signals provides a measuring for the distance between the projectile and the target, and this difference appears in the mixer unit 6. The differential signal from the mixer unit 6 is amplified in a low frequency amplifier 7 with a narrow band-pass filter.

If the differential signal has aa frequency which appears within the pass-band for the amplifier 7, and at the same time has an amplitude value which exceeds a certain threshold value, this signal will be detected in a detector circuit 8. Upon a signal from the detector circuit 8 a decision circuit 9 will generate a signal which closes the firing circuit (not shown) of the proximity fuse.

A differential signal which is achieved by mixing the transmitted and the reflected signal, will, as mentioned above, appear with a frequency that provides a measuring for the distance between the proximity fuse and the target of the projectile. FIG. 2*e* shows the waveform of such a signal after the same has passed the low frequency amplifier 7 if the distance between the projectile and the target is of such a magnitude that the transmitted and the reflected signals are substantially in phase.

By selecting various modulation frequencies in the modulation oscillator 1, but retaining the same band-pass filter in the amplifier 7, the proximity fuse can be made to detonate at various given distances from the designated target. When the oscillator 1 generates a higher modulation frequency, the proximity fuse will permit the projectile to detonate at a shorter distance from the target, while a lower modulation frequency will detonate the projectile at a further distance from the target.

A disturbing signal, e.g. a jamming signal, which is picked up by the antenna 5, will be mixed with the phase and frequency modulated signal coming from the amplifier 4. The disturbing signal will, however, not be phase modulated in accordance with the quasi-random code, and the differential signal from the output of the mixer unit 6 will therefore have a chopped form as indicated in FIG. 2f. The frequencies which this signal includes, will mainly be outside the bandwidth range of the amplifier 7. An additional safety against disturbing signals and against other noise that might occur is inherent in the detector 8 which is set at a threshold value.

In order to supply the decision circuit 9 with a signal ordering detonation of the projectile the transmitted and the reflected signals must be in phase in accordance with the phase modulation given by the quasi-random pulse code, the differential signal must be of a frequency which appears within the pass-band of the amplifier 7, and the differential signal must have a certain amplitude. Present systems, which only register the differential signal and the amplitude thereof, are seriously subjected to disturbing signals and noise.

By phase modulating the frequency modulated signal in accordance with the invention relatively high signal levels of the transmitted and the reflected signals are achieved, and hence a higher safety against disturbances from undesired signals.

In comparison with present frequency modulated systems the signal level of a disturbing signal must be approximately 100 to 200 times larger in order to disturb a system in accordance with the present invention to such an extent that it might result in undesired detonation.

By the phase modulation referred to it is also achieved that the phase correlation of the transmitted and the received signal is not coming into action before the projectile with the proximity fuse has reached a certain minimum distance from the designated target. This minimum distance is determined by the frequency of the clock generator, and this frequency is selected so that the distance exceeds the height of detonation, but is as close to it as possible.

Thereby is achieved an additional safety against the unintentional detonation of the projectile before the same has attained the correct distance from the target.

What I claim is:

1. Proximity fuse comprising a distance measuring system based on reflection of a frequency modulated signal having a linearly increasing sweep frequency, characterized in that the frequency modulated signal is phase modulated 180° in step with a quasi-random code.

2. Proximity fuse as indicated in claim 1, characterized in that the quasi-random code is generated in a coding unit comprising a clock generator driving a shift register via a feed-back circuit.

3. Proximity fuse as indicated in claim 2, characterized in that the quasi-random code is formed by a pulse train comprising logical bi-stable conditions which are periodically repeated in dependence on the storage capacity of the shift register and the design of the feedback circuit.

4. Proximity fuse as indicated in claim 1, characterized in that the phase and frequency modulated signal is transmitted via and is reflected back to an antenna and the transmitted and the reflected signals are mixed in a mixer unit from which the differential signal is supplied to an amplifier with a narrow pass-band.

5. Proximity fuse as indicated in claim 4, characterized in that the transmitted and the reflected signals are in phase when the system is closer to the target than a given distance depending on the frequency of the generator.

6. Proximity fuse as indicated in claim 4, characterized in that a detector detects the differential signal if the latter appears in the pass-band of the amplifier and at the same time has a given threshold value.

* * * * *